M. F. FULFORD.
METALLIC PACKING.
APPLICATION FILED MAY 23, 1908.

911,228.

Patented Feb. 2, 1909.

Witnesses

Inventor
Marcus F. Fulford.
By
Attorneys

THE NORRIS PETERS CO., WASHINGTON, D. C.

UNITED STATES PATENT OFFICE.

MARCUS F. FULFORD, OF FORT WORTH, TEXAS.

METALLIC PACKING.

No. 911,228. Specification of Letters Patent. Patented Feb. 2, 1909.

Application filed May 23, 1908. Serial No. 434,556.

*To all whom it may concern:*

Be it known that I, MARCUS F. FULFORD, citizen of the United States, residing at Fort Worth, in the county of Tarrant and State of Texas, have invented certain new and useful Improvements in Metallic Packings, of which the following is a specification.

The present invention provides a packing designed most especially for piston rods and valve stems of engines, pumps and the like, the purpose being to supply a packing which will insure the maintenance of a tight joint capable of being easily and economically applied, free from corrosion and adapted to vibrate with the rod or stem and thereby obviate binding and unsteady movement.

For a full understanding of the invention and the merits thereof and also to acquire a knowledge of the details of construction and the means for effecting the result, reference is to be had to the following description and accompanying drawings.

Figure 1:
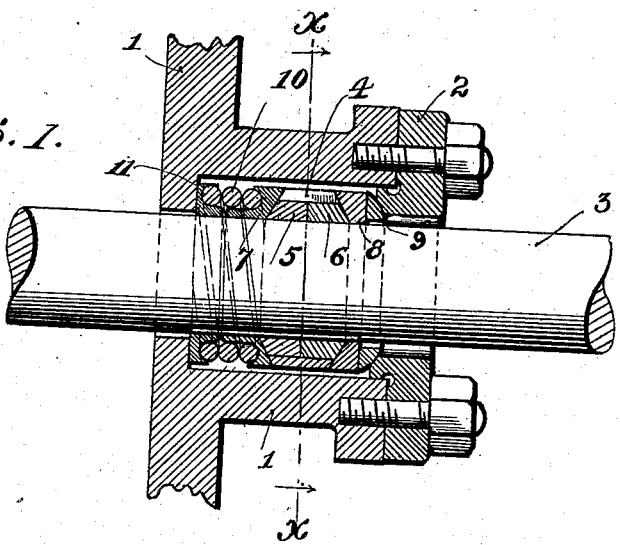
Figure 2:
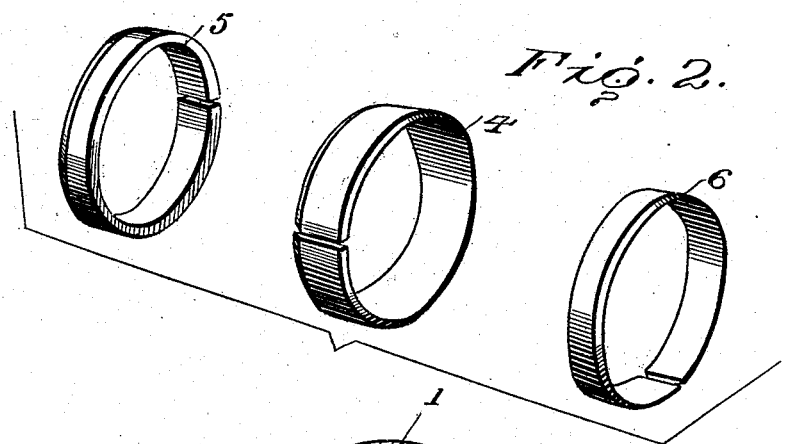
Figure 3:
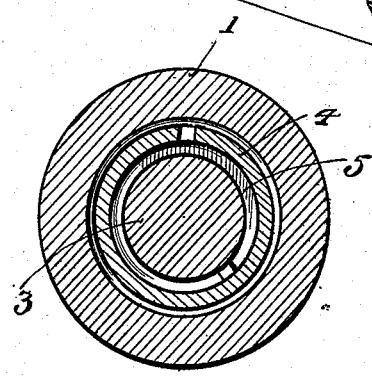

While the invention may be adapted to different forms and conditions by changes in the structure and minor details without departing from the spirit or essential features thereof, still the preferred embodiment is shown in the accompanying drawings, in which:

Figure 1 is a longitudinal section of a stuffing box provided with packing embodying the invention. Fig. 2 is a detail perspective view of the packing rings. Fig. 3 is a transverse section on the line $x$—$x$ of Fig. 1.

Corresponding and like parts are referred to in the following description and indicated in all the views of the drawings by the same reference characters.

The stuffing box 1 is closed at its outer end by the usual gland 2 and between said gland and the inner end of the stuffing box are located several parts consisting of the packing rings and the elements coöperating therewith.

The part 3 may be a rod or stem adapted to reciprocate in the stuffing box and between which and said stuffing box a tight joint is to be maintained.

The packing rings 4, 5 and 6 may be of any material according to the special adaptation of the packing, the ring 4 being arranged so as to encircle the rings 5 and 6 and to overlap the joint between them. The several packing rings 4, 5 and 6 are split and are arranged to break joint.

The outer edges of the rings 4 and 5 and 4 and 6 are oppositely beveled to correspond with the bevel of coöperating rings 7 and 8 located upon opposite sides of the packing rings. The vibrating ring 8 fits the rod or stem 3 snugly and abuts against the ball ring 9, which is interposed between the inner end of the gland and the vibrating ring 8. The pressure ring 7 sustains the outward thrust of a coil spring 10 which is interposed between it and the neck ring 11, the latter being placed against the inner shoulder formed at the inner end of the stuffing box 1.

The rings 8, 7 and 11 are bored so as to obtain a close joint upon the rod or stem 3 and are of a depth to admit of the coöperating parts obtaining ample purchase thereon. Sufficient space is provided between the inner walls of the stuffing box and the packing elements to admit of the latter vibrating with the rod so as to prevent unsteady movement or jar. The pressure ring 7 sustains the outward thrust of the spring 10 as well as the thrust upon the inner ends of the packing rings 4 and 5. The packing rings 4, 5 and 6 are sprung upon the rod or stem 3 so as to act automatically in maintaining a close joint therewith and with one another. The ball ring 9 forms a curved joint with the inner end of the gland 2 and is adapted to move and yet prevent the formation of a space which would admit of leak.

Having thus described the invention, what is claimed as new is:

1. In combination, a stuffing box, a rod or stem arranged to reciprocate therein, two split packing rings formed with oppositely beveled outer edges mounted upon said rod or stem and arranged to break joint, a third split packing ring mounted on the two packing rings and breaking joint therewith, said third ring being formed with beveled edges, a pressure ring, and a vibrating ring mounted upon the rod upon opposite sides of the packing rings and having their inner sides beveled, a ball ring between the vibrating ring and the gland of the stuffing box, a neck ring at the inner end of the stuffing box, and a pressure spring confined between the neck and rings.

2. In combination, a stuffing box, a rod or stem arranged to reciprocate therein, split packing rings mounted upon said rod or stem and arranged to break joint, a third packing ring mounted upon the said two packing rings and breaking joint therewith, the outer edges of the packing rings being oppositely beveled, a pressure ring, and a vibrating ring mounted upon the rod upon opposite sides of the packing rings and having their inner sides beveled, a ball ring between the vibrating ring and the gland of the stuffing box, a neck ring at the inner end of the stuffing box, and a pressure spring confined between the neck and pressure rings.

In testimony whereof I affix my signature in presence of two witnesses.

MARCUS F. FULFORD. [L. S.]

Witnesses:
FRANK B. STANLEY,
JNO. R. HANLEY.